Patented Mar. 20, 1934

1,951,770

UNITED STATES PATENT OFFICE 1,951,770

PROCESS FOR THE PRODUCTION OF NON-CORROSIVE PAINT PIGMENTS

Alphonse Friedrich Manfred Ragg, Wentorf, in Holstein, Germany, assignor of one-half to John Frank Rahtjen, Altona-Ottensen, Germany No Drawing. Application September 4, 1929, Serial No. 390,428. In Germany September 8, 1928

3 Claims. (Cl. 134—67)

It has been heretofore proposed to manufacture pigments for paints, specially for anticorrosives, from the oxides of lead, such as litharge or red lead or from lead compounds, such as white lead, which known method resides in treating these raw materials with solid, liquid or gaseous hydrocarbons in the absence of air up to about 300° C., the hydrocarbons being used in such amount, that no lower oxides of lead can be formed. Though with this method the absence of oxides of lead in the pigment was aimed at, as investigations have proved, this object could only be secured at the said temperature of 300° C. by a lengthy heating, which prejudices the simplicity and economy of the method. If the time of heating is shortened, the grey pigments formed, consist mainly of metallic lead; however, still a certain amount of oxides of lead will be present, which impairs the stability of the ready mixed paint and therefore has to be avoided.

The invention relates to a method, by means of which the presence of oxides of lead in the pigments is perfectly eliminated in an economic and simple manner and without the necessity of a lengthy heating. It has been found that pigments free from oxygen and thus free from oxides can be produced with certainty if the reduction is carried out at a temperature which is substantially beyond the melting point of lead, for instance 380–400° C. and higher.

There is no difficulty in applying such increased heat if gaseous organic compounds are used as reducing means. However, when using solid or liquid organic compounds, which per se are desirable, on account of the simplicity of the apparatus used in connection therewith, it will be necessary to select such, which at the said temperature of 380–400° C. are not already evaporized or decomposed. According to the invention therefore such solid or liquid organic compounds are proposed to be used, which possess a high boiling or melting point and do not decompose unless at a high temperature, such as pitch, asphaltum, copal, cumarone, soots, carbohydrates, molasses and the like. Moreover the metal compounds of phenols, resin acids, naphthenic acid, glycerine, etc., which are heat resisting to a certain extent, may also be used. Instead of making use of these metal compounds it is sufficient to add the said substances as such to the lead oxides. When heated at first lead salts are formed, which thereupon at 400° C. and more are decomposed.

The reduction at such temperature has the danger, that the reduced metal runs together to macroscopic, molten balls, which of course make the product unsuitable as a pigment. To avoid molten metal being produced according to the invention it is proposed to add inert substances, selected from those materials which are paint pigments, fillers, and extenders, and which do neither hinder the reduction nor impair the anticorrosive qualities of the pigment. These added inert substances form part of the resulting pigment. For such additional powders by way of example finely powdered ilmenite, oxide of zinc, silicates (such as asbestine) borates and the like are well adapted. The latter also are suitable for counteracting self-ignition, which now and then occurs when the pigment is exposed to the air.

Beside the organic reduction means or partly instead of such, inorganic reduction means may be employed, for instance metals of reducing properties, such as zinc dust. If zinc dust is used beside organic reduction means when heated up to 380°–400° C. a pigment will be formed which according to the formula

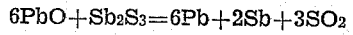
$$PbO + Zn = ZnO + Pb,$$

consists of metallic lead and zinc oxide.

The reaction is very turbulent. Although the carbon, which is separated during the reduction with organic substances and also the oxide formed reduce the reaction temperature considerably, it is nevertheless of advantage for safely avoiding the formation of molten metal, to add to the mixture one or more of the above named indifferent powders before heating. The zinc oxide which is formed at the reaction improves to a certain extent the qualities of the pigment and of the anticorrosive paint made therefrom. As a substitute for zinc aluminium, magnesium, calcium, antimony or similar reducing metals may of course be used.

Instead of the said metals also metal sulphides, for instance galena or antimony sulphide may be used. According to the formula:

$$6PbO + Sb_2S_3 = 6Pb + 2Sb + 3SO_2$$

an alloy of lead and antimony is thereby formed. A small part of the $Sb_2S_3$ directly combines with the PbO, forming a black compound which does not saponify with the vehicle.

As has been mentioned above inorganic reduction means (metals or metal sulphides) may be used partly or fully instead of the organic reduction means. Thus it is possible to produce pigments free from oxides of lead, for instance after the formula:

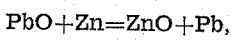
$$PbO + Zn = ZnO + Pb,$$

as long as care is taken, that the explosive-like reaction is weakened, and the formation of molten lead is avoided by adding the above suggested additional powder or small amounts of organic reduction means.

The reduction metals may be even used in a surplus, the pigments then formed consisting of alloys of lead free from oxide.

*The following are examples*

1. 100 kg. litharge (waste, finely powdered) are heated with 10 kg. of wood tar and 10 kg. asbestine in a suitable apparatus up to 380° C. and more while excluding air.

2. 100 kg. waste lead oxide containing antimony are mixed with 10 kg. copal dust and 10 kg. finely pulverized ilmenite and slowly heated in a revolving drum while excluding air. At about 200° C. lead salts of the copal acids are formed, which at a higher temperature (380° C.) begin to decompose, whereupon the products of decomposition reduce the PbO to finely divided metal.

3. 300 kg. litharge are intimately mixed with 4 kg. finely powdered petroleum pitch and 20 kg. zinc dust, and heated at 400° C., while excluding air. The mixture begins to glow and the complete reduction to metal takes place.

4. 120 kg. litharge are mixed intimately with 5 kg. finely powdered petroleum pitch, 8 kg. finely powdered antimony sulphide and 15 kg. oxide of zinc, introduced into a crucible provided with an agitator and previously heated up to 380° C. and more and then further heated as long as vapors escape. During the process air to be excluded.

In all these cases a grey pigment of great fineness and free from ovides of lead is produced, which when ground with suitable vehicles such as linseed oil, stand oil or wood oil, is directly adapted to produce effective and stable anticorrosive paints.

By the examples stated above not all ways are exhausted to secure a lead pigment free from oxides. Thus to the same end for instance also carbides, carbon black, and other reduction means may be used. The invention is neither limited to litharge, red lead or white lead as starting substanced. Even smelting products may be used with advantage, containing besides lead antimony and other metals, such as zinc or tin. The pigments then do not consist of pure lead, but contain the corresponding alloys. If alloys of special composition are wanted, the metals or their oxides may be added to the mixture in a finely divided state and to the requisite amount before reaction takes place.

I claim:

1. A method of producing pigments, particularly adapted for anticorrosive paints, comprising the steps of heating raw materials containing lead in oxidized state together with reduction means in the substantial absence of air, maintaining the temperature of reaction above the melting point of lead, and adding to the lead-containing materials an additional powdered substance selected from the group which consists of ilmenite, oxide of zinc, silicates, and borates, which indifferent substances neither impair the reduction nor the anticorrosive qualities of the resultant pigment, whereby the product is obtained in finely divided form suitable for pigmentary use without any additional treatment.

2. A method of producing pigments particularly adapted for non-corrosive paints comprising the steps of heating raw materials containing lead in oxidized state together with reduction means in the substantial absence of air, maintaining the temperature of the reaction above the melting point of lead, and adding to the raw material an additional substance selected from the group which consists of paint pigments, fillers, and extenders which neither impair the reduction nor the non-corrosive qualities of the resulting pigment, for the purpose of preventing the formation of macroscopic balls of lead.

3. A method of producing pigments particularly adapted for non-corrosive paints, comprising the steps of heating raw materials containing lead in oxidized state together with organic reducing agents in the substantial absence of air, maintaining the temperature of the reaction above the melting point of lead, and adding to the raw material an additional substance selected from the group which consists of paint pigments, fillers, and extenders which neither impair the reduction nor the non-corrosive qualities of the resulting pigment, for the purpose of preventing the formation of macroscopic balls of lead, said organic reducing agents being selected from those substances characterized by a high melting point and by a substantial degree of stability of heat, said reducing agents being capable of maintaining their reducing action at the relatively elevated temperature of the reduction.

ALPHONSE FRIEDRICH MANFRED RAGG.